United States Patent
Perez et al.

(10) Patent No.: US 11,694,093 B2
(45) Date of Patent: Jul. 4, 2023

(54) GENERATION OF TRAINING DATA TO TRAIN A CLASSIFIER TO IDENTIFY DISTINCT PHYSICAL USER DEVICES IN A CROSS-DEVICE CONTEXT

(71) Applicant: Adobe Inc., San Jose, CA (US)

(72) Inventors: Christian Perez, Cambridge, MA (US); Eunyee Koh, San Jose, CA (US); Ashley Rosie Weiling Chen, Providence, RI (US); Ankita Pannu, San Jose, CA (US)

(73) Assignee: Adobe Inc., San Jose, CA (US)

( * ) Notice: Subject to any disclaimer, the term of this patent is extended or adjusted under 35 U.S.C. 154(b) by 1038 days.

(21) Appl. No.: 15/920,934

(22) Filed: Mar. 14, 2018

(65) Prior Publication Data
US 2019/0287025 A1    Sep. 19, 2019

(51) Int. Cl.
*G06N 5/04*    (2023.01)
*G06N 3/008*    (2023.01)

(52) U.S. Cl.
CPC .............. *G06N 5/04* (2013.01); *G06N 3/008* (2013.01)

(58) Field of Classification Search
CPC .......... G06N 5/04; G06N 3/008; G06N 5/022; G06N 20/20; H04L 29/08621; H04L 67/146
See application file for complete search history.

(56) References Cited

U.S. PATENT DOCUMENTS

| 8,583,566 | B2* | 11/2013 | Aravamudan | G06F 16/2457 706/12 |
| 8,886,645 | B2* | 11/2014 | Jones | G06Q 30/0241 707/733 |
| 9,503,537 | B1* | 11/2016 | Neshmonin | H04L 67/535 |
| 9,514,248 | B1* | 12/2016 | Guan | H04L 29/06 |
| 9,648,581 | B1* | 5/2017 | Vaynblat | H04L 67/535 |
| 9,672,289 | B1* | 6/2017 | Frind | G06Q 50/01 |

(Continued)

OTHER PUBLICATIONS

Volkova, Cross-device tracking with machine learning, Spring 2017, University of Oslo, sections 2-3.3.1.1 (Year: 2017).*

(Continued)

*Primary Examiner* — Michael J Huntley
*Assistant Examiner* — Oluwatosin O Alabi
(74) *Attorney, Agent, or Firm* — Finch & Maloney PLLC

(57) ABSTRACT

Techniques are disclosed for accurately identifying distinct physical user devices in a cross-device context. An example embodiment applies a multi-phase approach to generate labeled training datasets from a corpus of unlabeled device records. Such labeled training datasets can be used for training machine learning systems to predict the occurrence of device records that have been wrongly (or correctly, as the case may be) attributed to different physical user devices. Such identification of improper attribution can be particularly helpful in web-based analytics. The labeled training datasets include labeled pairs of device records generated using multiple strategies for inferring whether the two device records of a pair of device records represent the same physical user device (or different physical user devices). The labeled pairs of device records can then be used to train classifiers to predict with confidence whether two device records represent or do not represent the same physical user device.

19 Claims, 8 Drawing Sheets

(56) References Cited

U.S. PATENT DOCUMENTS

| | | | | |
|---|---|---|---|---|
| 10,559,013 | B2* | 2/2020 | Garcia-Martinez | ............................ G06Q 30/0275 |
| 2010/0310158 | A1* | 12/2010 | Fu | ........................ G06K 9/6278 382/159 |
| 2011/0288940 | A1* | 11/2011 | Horadan | ............ G06Q 30/0273 705/14.69 |
| 2014/0095320 | A1* | 4/2014 | Sivaramakrishnan | ........................ G06F 21/316 705/14.66 |
| 2017/0013070 | A1* | 1/2017 | Comstock | .............. H04L 67/535 |
| 2017/0124578 | A1* | 5/2017 | Bennett | .............. G06Q 20/3224 |
| 2017/0161761 | A1 | 6/2017 | Koh et al. | |
| 2019/0149626 | A1* | 5/2019 | Shah | ........................ G06N 7/005 706/12 |
| 2020/0036703 | A1* | 1/2020 | Håkansson | .............. H04L 67/02 |

OTHER PUBLICATIONS

"Cross-device tracking with machine learning", Elena Volkova, Spring 2017, University of Oslo (Year: 2017).*

"Cross-Device Tracking: Matching Devices and Cookies", Diaz Morales et al., Oct. 2015 (Year: 2015).*

Borgesius FJ. Singling out people without knowing their names—Behavioural targeting, pseudonymous data, and the new Data Protection Regulation. Computer Law & Security Review. Apr. 1, 2016;32(2):256-71. (Year: 2016).*

Brookman J, Rouge P, Alva A, Yeung C. Cross-Device Tracking: Measurement and Disclosures. Proc. Priv. Enhancing Technol.. Apr. 2017;2017(2):133-48. (Year: 2017).*

Díaz-Morales et al., "Cross-Device Tracking: Matching Devices and Cookies", arXiv:1510.01175v1, retrieved from https://arxiv.org/pdf/1510.01175.pdf (submitted Oct. 5, 2015).

Landry, M. et al., "Multi-layer Classification: ICDM 2015 Drawbridge Cross-Device Connections Competition".

Walthers, J., "Learning to rank for cross-device identification".

Ejela, G. and C. Rong, "Cross-device consumer identification", in IEEE International Conference on Data Mining Workshop, ICDMW 2015, 3 pages.

Koehler, J. et al., "Measuring Cross-Device Online Audiences", Google Tech Report, 2016, 33 pages.

Dasgupta, A. et al., "Overcoming browser cookie churn with clustering".

Google cross-device 2016 study, "Measuring Cross-Device Online Audiences", retrieved from the Internet: https://ai.google/research/pubs/pub45353 [copy retreived Jul. 12, 2018], 2 pages.

* cited by examiner

GENERATION OF TRAINING DATA TO TRAIN A CLASSIFIER TO IDENTIFY DISTINCT PHYSICAL USER DEVICES IN A CROSS-DEVICE CONTEXT

FIELD OF THE DISCLOSURE

This disclosure relates generally to training a classifier to execute a specific task, and more particularly, to generating training data for training a classifier to identify distinct physical user devices in a cross-device context.

BACKGROUND

As the number of people with access to the Internet continues to grow, online resources such as websites and software applications have become an increasingly important way for businesses, government agencies, and other entities to interact with the general public. For example, businesses routinely use websites to distribute information regarding products and services, conduct advertising and public relations campaigns, and transact business by receiving orders and payments. As a result, substantial resources are devoted to proper accounting of the various user devices accessing these websites. Proper accounting of user devices allows for accurate reporting of user device counts and activity estimates. For example, accurate reporting of user device counts may be useful to commercial entities for purposes of evaluating the effectiveness of an online advertising campaign with respect to a target audience, or improving website efficacy in meeting user expectations.

Yet, inaccuracy currently exists in such device reporting due to device records that seem to be from distinct devices based on cookie logs, but in actuality are from a single device. For example, duplication of device records is commonly caused by natural cookie churn that results from, for example, the expiration of authentication event cookies and/or security tools that periodically remove cookies. Another source causing duplication of device records is generally attributable to the use of multiple distinct internet browsers on a single physical computing device or system, and the use of multiple distinct applications on a smart phone, to name two examples. The existence of duplicate device records presents substantial obstacles from an analytics point of view, particularly in correctly attributing specific devices to specific users. Existing solutions, such as those presented in the ICDM 2015 Drawbridge Kaggle competition, have attempted to use supervised learning to train and use machine learning classifiers to match physical devices to a user in a cross-device context. Unfortunately, supervised learning requires labeled training data, which is very expensive and time consuming to generate. Moreover, data that is available for labeling is oftentimes very scarce, thus resulting in very limited training sets. The limited training sets in turn result in trained classifiers that are limited or otherwise deficient in making accurate predictions of user devices in a cross-device context. To this end, there is a need for efficiently generating more comprehensive and robust labeled training data for training classifiers to identify distinct physical user devices in a cross-device context.

BRIEF DESCRIPTION OF THE DRAWINGS

The accompanying drawings are not intended to be drawn to scale. In the drawings, each identical or nearly identical component that is illustrated in various figures is represented by a like numeral, as will be appreciated when read in context.

Figure 1:
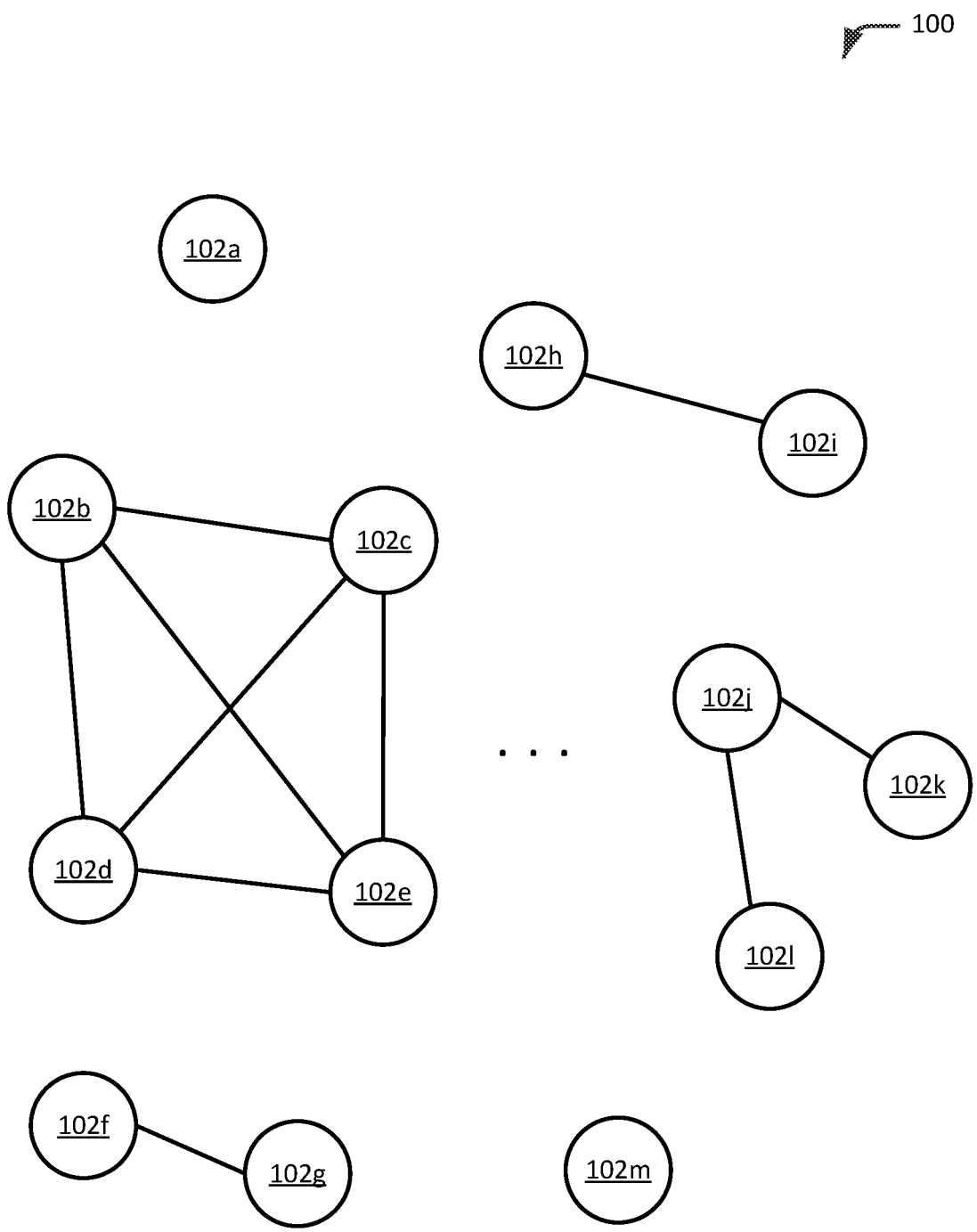
FIG. 1 illustrates an example graph for modeling a corpus of unlabeled device records, in accordance with an embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

DETAILED DESCRIPTION

Techniques are disclosed for generating labeled training data that can be used to train a classifier to accurately identify distinct physical user devices in a cross-device context. An example of cross-device context is where, for instance, a given user accesses an e-commerce website using first and second physical devices (such as in the case where the first device is the user's smartphone and the second device is the user's laptop). In an example embodiment, the disclosed techniques are implemented as a training label generator. The training label generator is configured to generate labeled training datasets that can be used to train, for example, a binary classifier to predict or otherwise infer with confidence whether two device records are associated with the same physical device or two different physical devices. In operation, the training label generator executes a multi-phase process on a corpus of device records to generate labeled training data, as will be explained in turn. The corpus of device records may be provided, for example, as part of a device analytics platform. A device record may include, for instance, a device identifier, authentication information such as a login identifier for an interactive session, and other such trackable information associated with the interactive session. Such device records can be paired (to form device record pairs) based on a shared or common authentication event (e.g., log-in credentials), using a graphical model as further explained below. The multi-phase process includes a pre-processing phase to filter out trivial device record pairs, a positive label generation phase that generates a set of positively labeled device record pairs (e.g., known to correspond to truly-equivalent physical devices) from remaining device record pairs, and a negative label generation phase that generates a set of negatively labeled device record pairs (e.g., known to correspond to truly-distinct physical devices) from the remaining device record pairs. A training dataset is then generated from the set of positively labeled device record pairs and the set of negatively labeled device record pairs, as is further explained in detail below. The resulting training set can then be used to train a binary classifier using record device pairs of positive label sets (e.g., known to correspond to truly-equivalent physical devices) and negative label sets (e.g., known to correspond to truly-distinct physical devices), as further discussed below. Once trained on such a robust training dataset, the trained classifier can accurately identify distinct physical user devices in a cross-device context. The trained classifier is particularly useful, for instance, in identifying device records that are wrongly attributed to multiple devices, wherein device records of seemingly distinct devices are more accurately determined to be device records of the same device.

As noted above, device pairs can be generated using a graphical model, according to some embodiments. In more detail, the corpus of device records is modeled as a graphical model (also referred to herein as a device record graph or simply graph for brevity) including multiple nodes and edges, wherein a device record pair is represented by two nodes connected by an edge. The graph thus allows for pairing device records, where the two device records (nodes) in a pair of device records share a common authentication event (edge). For example, suppose device record A indicates authentication by X, and device record B also indicates authentication by X. In this case, device record A and device record B can be paired as a pair of device records that share a common authentication event. The training label generator applies the multi-phase approach (noted above and further explained below) to label some or all of the pairs of device records, where a label for a pair of device records indicates whether the two device records are equivalent (i.e., represent the same physical device) or not equivalent (i.e., do not represent the same physical device). The labeled pairs of device records can then be used to train one or more suitable classifiers to predict with relatively high confidence whether two device records are equivalent or not equivalent.

As will be appreciated in light of this disclosure, the multi-phase approach allows for a relatively high degree of accuracy in the labeling of device records. In more detail, and in accordance with an embodiment of the present disclosure, the multi-phase approach includes a pre-processing phase, a positive label generation phase, and a negative label generation phase. In the pre-processing phase, the training label generator identifies and filters (removes) "trivial" pairs of device records from further consideration for inclusion in the labeled training datasets. A pair of device records is determined to be trivial if an inference can be made with a high degree of confidence that the two device records of a pair of device records are not equivalent. One example of a trivial case is where the two device records are of non-matching (different) device hardware types (e.g., one device record identifies a desktop device and the other device record identifies a laptop device, or each of the device records is associated with a different IP addresses or other determinable ID). Another example of a trivial case is where the two device records of a pair of device records are of matching (same) device hardware types, but of non-matching (different) device operating system types (e.g., one device record identifies a Windows® operating system, and the other device record identifies an Apple® operating system or a different version of the Windows® operating system). Other determinable information that can be used to identify trivial cases will be apparent in light of this disclosure. In some cases, singleton device records that are not connected to any of the other device records by a common authentication event may also be deemed trivial and filtered from further consideration for inclusion in the labeled training datasets. In any such cases, the identified trivial pairs of device records and the singleton device records are effectively eliminated from further consideration for use as labeled training data. The pairs of device records that remain after culling the trivial cases can possibly be included in the labeled training datasets, depending on the outcome of further processing in the positive and negative label generation phases as will now be briefly further explained.

In more detail, during the subsequent positive label generation phase, the training label generator leverages an external data source to identify, from the remaining pairs of device records, the pairs of device records that are equivalent. In particular, if a given pair of device records in the external data source is determined to be equivalent, then it is reasonable to identify that same pair of device records as being equivalent if that pair is also present in the remaining pairs of device records. Accordingly, the external data source can be used to effectively corroborate or otherwise confirm the equivalency of device records of device record pairs included in the corpus of device records, and therefore facilitates the labeling of pairs of device records as being equivalent with relatively high confidence. To this end, the training label generator identifies pairs of device records from the remaining pairs of device records that are identified as being equivalent in the external data source, and correspondingly labels such pairs of device records as being equivalent, according to an embodiment. Numerous other determinable information that can be used to identify equivalent device records will be apparent in light of this disclosure.

In the negative label generation phase, the training label generator leverages temporal activity data associated with the device records to identify, from the remaining pairs of device records, the pairs of device records that are not equivalent. The temporal activity data can be used to identify specific temporal conditions in which a pair of device records is guaranteed or nearly guaranteed to be not equivalent. One example temporal condition is based on the premise that operating system version downgrades rarely occur. So, for example, suppose that a pair of device records includes device records A and B, that device record A indicates a first operating system (e.g., Windows® 8 operating system) and that device record B indicates a second operating system (e.g., Windows® XP operating system). In this case, if activity from device record B is recorded (e.g., time stamped or otherwise dated) prior to activity from device record A, a reasonable inference can be made that device record A and device record B are not caused by the same device and therefore are not equivalent. Similar to operating system version downgrades, another example temporal condition may be based on the premise that application version downgrades on user devices rarely occur, such as a browser application version downgrade. To this end, the training label generator identifies pairs of device records from the remaining pairs of device records that satisfy such temporal conditions, and correspondingly labels such pairs of device records as being not equivalent.

In some embodiments, the training label generator can leverage the external data source to identify, from the remaining pairs of device records, the pairs of device records that are not equivalent. For example, if the two device records of a pair of device records are included in the external data source but not identified as being equivalent in the external data source, a reasonable inference can be made that the pair of device records are not equivalent. This is the inverse of the condition the external data source satisfied for facilitating the identification of pairs of device records that are equivalent. This inverse condition may apply to certain types of device, such as mobile devices, for example. For example, taking the case of mobile devices as one example, suppose a pair of device records includes device records C and D, and both device records C and D indicate a mobile device as a device type. In this case, if device records C and D are also included in the external data source but not identified as being equivalent in the external data source, a reasonable inference can be made that device record C and device record D are not equivalent. To this end, for the pairs of device records that are of the type of devices for which the inverse condition applies, the training label generator identifies the pairs of device records that satisfy the inverse condition, and correspondingly labels such pairs of device records as being not equivalent, according to some embodiments. Numerous other determinable information that can be used to identify non-equivalent device records will be apparent in light of this disclosure.

In the training phase, the pairs of device records labeled as equivalent and the pairs of device records labeled as not equivalent based on temporal activity data can be used as a first labeled training dataset to train a first classifier, such as a logistic regression classifier or any other suitable binary classifier for detecting one of two classes (in this case equivalent devices or not equivalent devices). Once trained, the trained first classifier can predict with confidence whether a given pair of device records is equivalent or not equivalent. In embodiments where an external data source is leveraged to identify pairs of device records that are not equivalent, the pairs of device records labeled as equivalent and the pairs of device records labeled as not equivalent based on the external data source can be used as a second labeled training dataset to train a second classifier. Once trained, the trained second classifier can predict with confidence whether a given pair of device records that is of the type of devices over which the second classifier is trained is equivalent or not equivalent.

In still other example embodiments, pairs of device records predicted to be equivalent are input or otherwise provided to a connected-components module configured to perform a connected-components analysis. In some such embodiments, the connected-components module is able to identify additional device records that are equivalent to the provided pairs of device records predicted to be equivalent based on the transitive property. For example, suppose a first pair of device records predicted to be equivalent includes device records A and B, and a second pair of device records predicted to be equivalent includes device records A and C. In this case, the connected-components module can determine that device record B and device record C are equivalent based on the transitive property. These and other advantages and alternative embodiments will be apparent in light of this disclosure.

Example System

Various embodiments of the techniques disclosed herein facilitate the generation of labeled training datasets from a corpus of unlabeled device records. The labeled training datasets can then be used to train one or more classifiers using supervised learning to, provided a device record pair, predict with confidence whether the device records of the device record pair are equivalent (i.e., represent the same physical device). In an example implementation, the corpus of unlabeled device records may be modeled as a graph to facilitate the labeling of the device record pairs for inclusion in the labeled training datasets. FIG. 1 illustrates an example graph 100 for modeling a corpus of unlabeled device records, in accordance with an embodiment of the present disclosure. Graph 100 may be considered a device record graph. As can be seen, example graph 100 includes many device records (as represented by circles) and edges (as represented by lines) between certain pairs of device records. An edge between two device records serves as an indication that the two connected device records form a device record pair. More specifically and as depicted in FIG. 1, example graph 100 includes device records 102a-102m, and edges between device records 102b and 102c, device records 102b and 102e, device records 102b and 102d, device records 102c and 102d, device records 102c and 102e, device records 102d and 102e, device records 102f and 102g, device records 102h and 102i, device records 102j and 102k, and device records 102j and 102l. In addition, device records 102a and 102m are singleton device records that are not connected to any of the other device records. Accordingly, device records 102b and 102c, device records 102b and 102e, device records 102b and 102d, device records 102c and 102d, device records 102c and 102e, device records 102d and 102e, device records 102f and 102g, device records 102h and 102i, device records 102j and 102k, and device records 102j and 102l are each device record pairs (e.g., a total of 10 device record pairs), which can be labeled and included in the labeled training datasets. For example, the edge between device records 102b and 102d can be labeled to indicate that device records 102b and 102d are equivalent (or not equivalent). In contrast, singleton device records are not suitable for labeling as there is no edge that connects to a singleton device record. The number of device records and edges depicted in graph 100 is for illustration, and it will be appreciated in light of this disclosure that the corpus of unlabeled device records will typically include a large, and in some instances very large, numbers of device records and edges.

In a more general sense, the nodes in a device record graph represent device records, and the edges among the nodes represent shared authentication events as recorded by, for example, cookies. In the device record graph, a device record pair is represented by two nodes connected by an edge. In one implementation, the device record graph modeling the corpus of unlabeled device records can be represented as G, the collection of nodes can be represented as V, and the collection of edges can be represented as E. In such implementations, graph G includes one device record per detected physical device. Also, an authentication event associated with a device record is independent of all other device records. For example, consider a user owning a desktop device and a mobile device, and who has logged into their user profile (e.g., logged in to a website) using both devices. This may produce device records u and v in graph G, and an edge e=(u,v) among the nodes u and v, where (u,v)∈V and e∈E. With continued correct attribution of future browsing sessions on these two devices, this user is represented in graph G by only these two device records, u and v, and any subsequent browsing sessions on either device are correctly attributed to u or v. In practice, duplication of device records may commonly occur due to causes such as the expiration of authentication event cookies, the use of multiple browsers on a single device, and device sharing among users, to name three examples. Continuing the example above, a single instance of duplication for this user on both devices u and v can lead to the creation of new records u' and v' in graph G, along with all pairwise edges among the nodes in the user's recorded device set {u, v, u', v'}. In an example convention, the notation $u\sim_S v$ can be used to represent two nodes u and v in a device record graph S if the nodes u and v are known to represent the same physical device (e.g., u and v are device equivalent). Conversely, the notation $u\sim_S v$ can be used to represent two nodes u and v in a device record graph S if the nodes u and v are known to represent different physical devices (e.g., u and v are device non-equivalent). Continuing the example above and in accordance with the example convention, correct attribution of browsing sessions allows for the establishment of the relations $u\sim_G u'$ and $v\sim_G v'$, thus representing the user as two distinct physical devices.

Accordingly and in a general sense, various embodiments of the techniques disclosed herein facilitate the creation of models for learning the Boolean relation $u\sim_G v$ or $u\sim_G v$ among two devices u and v in a graph G connected by a shared authentication edge e=(u,v). Certain of the embodiments disclosed herein allow for the generation of labeled training datasets using multiple strategies, as will be further described below, to identify when $u\sim_G v$ or $u\sim_G v$ can be inferred with high degrees of confidence. The generated labeled training datasets can be used to train machine learning algorithms to predict device equivalence or device non-equivalence among shared authentication device record pairs.

Although certain embodiments and/or examples are described herein in the context of cookies, it will be appreciated in light of this disclosure that such embodiments and/or examples are not restricted as such, but are applicable to record logs that maintain device and user authentication records in the general sense. Moreover, the specific notation used herein to represent the device record graph, and the various aspects associated with the device records, is for illustration, and one skilled in the art will appreciate that the device record records and the various aspects associated with the device records, such as device record pairs and the labeling of the device record pairs, may be represented using other descriptive techniques. Furthermore and in some embodiments, the device records need not be modeled as a graph, as will be appreciated in light of this disclosure.

As used herein, the term "device record pair" refers, in addition to its plain and ordinary meaning, to a pair of device records that shares an authentication event. One example of a device record pair is two device records that are each created as a result of a common authentication event. As one example, a user who logs in to their user profile (e.g., authenticates onto their user profile) on a website using both a laptop computer and a smart phone will produce two distinct device records that share an authentication event (e.g., user logging in to their user profile) as produced, for example, by the two different devices. As another example, a user signed in to their profile on two different browsers on the same laptop computer will produce two distinct device records that share an authentication event as produced by, for example, two different authentication event cookies on each browser.

Figure 2:
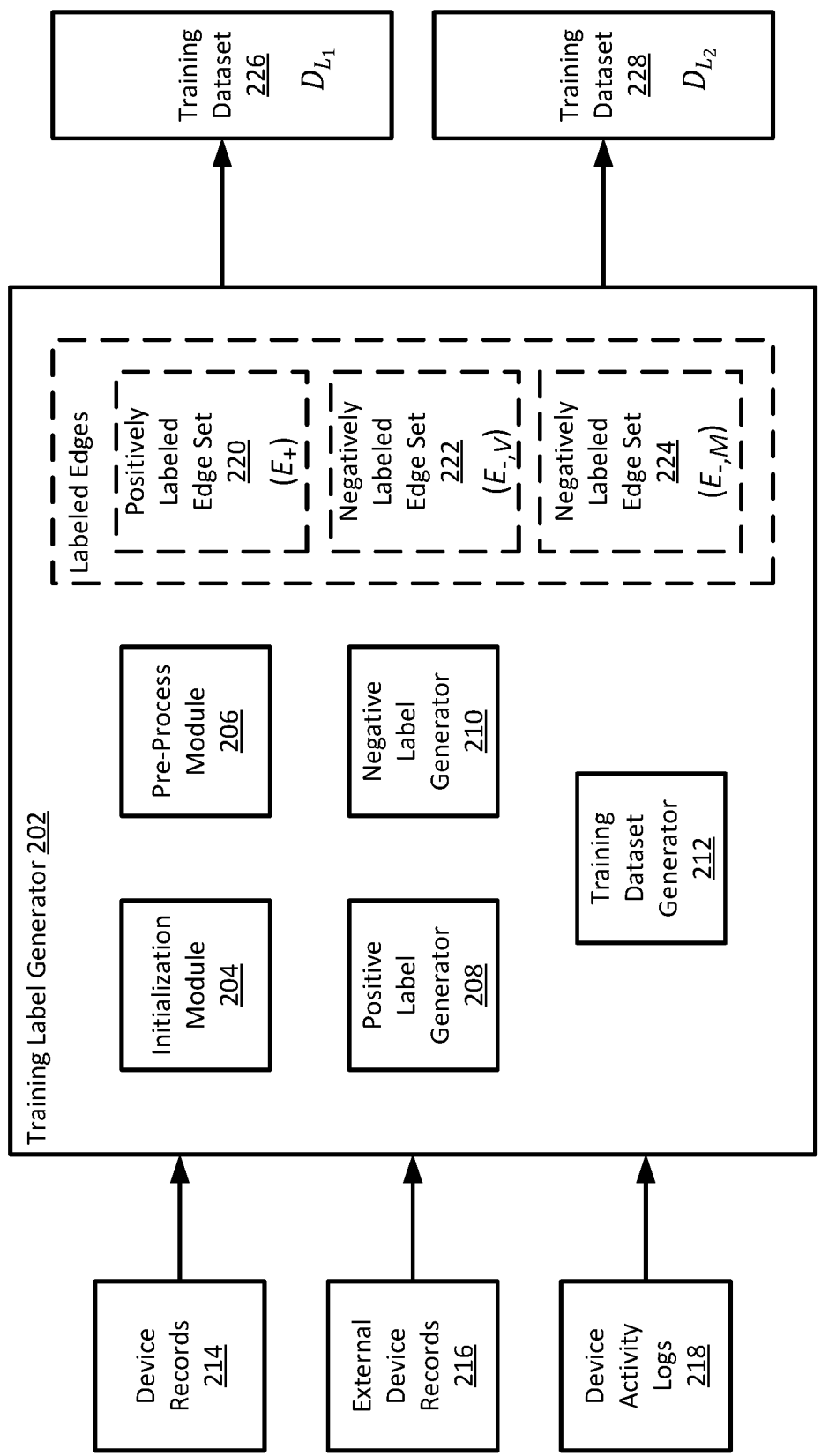
FIG. 2 illustrates selected components of an example training label generator, in accordance with an embodiment of the present disclosure.

FIG. 2 illustrates selected components of an example training label generator 202, in accordance with an embodiment of the present disclosure. As depicted, training label generator 202 includes an initialization module 204, a pre-process module 206, a positive label generator 208, a negative label generator 210, and a training dataset generator 212. In various embodiments, additional components (not illustrated, such as a processor, display, user input device, non-transitory memory, etc.) or a subset of the illustrated components can be employed without deviating from the scope of the present disclosure. For instance, other embodiments may integrate the various functionalities of modules 204 and 206 into fewer modules (e.g., one) or more modules (e.g., three, four or five, or more), and generators 208, 210, and 212 into fewer generators (e.g., one or two) or more modules (e.g., four, five or six, or more). In addition, further note that the various components of training label generator 202 may all be in a stand-alone computing system according to some embodiments, while in others, may be distributed across multiple machines. For example, module 204 may be provided in a computing system distinct from a computing system of training label generator 202. In a more general sense, the degree of integration and distribution of the functional component(s) provided herein can vary greatly from one embodiment to the next, as will be appreciated in light of this disclosure.

In one example use and embodiment, training label generator 202 receives or otherwise obtains device records 214 from which to generate the training datasets as variously described herein. In some cases, device records 214 may be provided as part of a device analytics platform. Each device record includes information regarding an associated device, such as a device identifier, suitable user authentication data from which to identify authentication events, and attributes that capture both static and dynamic device information, and any other suitable information. Examples of attributes capturing static information include device hardware type (e.g., desktop, laptop, tablet, mobile phone, etc.), device operating system type (e.g., Windows®, Apple®, etc.), device browser type (e.g., Chrome™, Safari®, Firefox®, etc.), device browser vendor type (e.g., Google, Apple®, Mozilla, etc.), device geographic location (e.g., latitude and longitude coordinates, etc.), to name a few examples. Examples of attributes capturing dynamic information include most frequent and second most frequent Internet Protocol (IP) addresses accessed, most frequent and second most frequent Uniform Resource Locator (URL) domains visited, and most frequent and second most frequent locations (e.g., latitude and longitude coordinates, etc.) visited, to name a few examples. Training label generator 202 also receives or otherwise obtains external device records 216 and device activity logs 218, which are utilized in processing device records 214 to generate the training datasets. In some embodiments, external device records 216 can be more persistent device records provided by an external data source.

Initialization module 204 is configured to identify device record pairs from device records 214. As described previously, in an example implementation, initialization module 204 models device records 214 as a device record graph G={V, E}, in which the device records (nodes V) are connected by shared authentication events (edges E). That is, an edge e=(u, v) between two device records (u,v)∈V exists only if the same user authentication event (e.g., profile log in) is indicated by both device records. In some embodiments, graph G may be provided to training label generator 202.

In some such implementations, initialization module 204 models external device records 216 as a device record graph H={(V', E'}, in which the devices (nodes V') are connected by shared authentication events (edges E'). External device records 216 provide a more persistent external dataset that can be leveraged to generate positive labels for some or all of the edges E in graph G. To be able to serve as an external dataset, note that there needs to be a non-trivial intersection (e.g., an overlap) between device records 214 and external device records 216. Moreover, the device records common to both device records 214 and external device records 216 need to be readily linked (e.g., identifiable) across device records 214 and external device records 216. In graph H, edges e=(u,v)∈V' denote physical device equivalence between u and v with a high degree of likelihood (denoted by $u\sim_H v$). That is, u and v in an edge e=(u,v)∈V' can be viewed as duplicate records of a physical device in graph H, but may capture (e.g., record) the state of the physical device at different points in time, for example, as compared to graph G. Positive label generator 208, described further below, leverages this known duplication in graph H to detect analogous duplicate device records in graph G. In an example embodiment, records from the Identifier for Advertising (IDFA) logs may be used as external device records 216. The IDFA logs capture the state of a physical device at different points in time according to an IDFA delivered to the device. Unlike cookies, the IDFA is not automatically reset unless manually reset, for example, by a user, using the preference settings, thus making the IDFA logs more persistent than cookie logs. In some embodiments, graph H may be provided to training label generator 202.

Device activity logs 218 include activity records associated with the devices corresponding to device records 214. The activity records may contain activity information and related data, such as site URL, device hardware type, geographic location, and associated timestamp information, to name a few examples. For example, in the case of a user browsing a website, the activity records associated with the user may record the user's browsing activity at various times during the browsing session or sessions. In an example implementation, device activity logs 218 can be represented as $$\{r_{u,t}\}_{t=t_{u,0}}^{t_u,T_u} \; u \in V,$$

where each activity record $r_{u,t_{u,k}}$ corresponds to device u's activity, such as browsing activity as one example, at a given device activity timestamp $t_{u,k} \in \{t_{u,0}, \ldots, t_{u,T_u}\}$. Devices may produce activity logs at differing numbers of timestamps denoted by $T_u$ for device u.

Pre-process module 206 is configured to pre-process the device record pairs to filter out the trivial device record pairs from further consideration for inclusion in the training datasets. Trivial device record pairs are those device record pairs where an inference of non-equivalence can be made with a high degree of confidence. In the device record graph G implementation, pre-process module 206 removes the trivial edges from E. The trivial edges are the obvious cases of non-equivalence of device records of a device record pair, such as a device record pair among device records with different device hardware types or different device operating system types, for example. For example, information such as device hardware types, device operating system types, and other such attribute information associated with a device record may be provided by the device and stored by the cookie. As one example of a trivial edge, if a device record u is identified as a desktop device and shared authentication device record v is identified as a mobile device, pre-process module 206 can conclude that these two device records do not represent the same physical device. In this instance, pre-process module 206 can remove the trivial edge e connecting device records u and v (e.g., e=(u, v)) from E. As another example of a trivial edge, suppose two devices u and v in an edge e=(u, v) are both recorded to be the same physical type devices (e.g., both desktops), and yet u is recorded as an Apple® machine while v is recorded as a Windows® machine. In this instance, pre-process module 206 can conclude that u and v do not represent the same physical device, and remove the trivial edge e from E. Note that this assumption may fail in cases of virtual execution, for example, where an Apple® virtual machine is operated within a Windows® machine. To this end, a reasonable inference that can be made by pre-process module 206 is that the numbers of these cases is considered to be minimal, and not an impact to the generation of the training datasets as described herein. Accordingly, in the pre-processing phase, for the purpose of generating training datasets for training machine learning algorithms for predicting device records, pre-process module 206 removes the trivial edges e from graph G, thus effectively removing the trivial edges e from E, prior to the label generation phase.

Positive label generator 208 is configured to identify device record pairs that are duplicates of (represent) the same physical device based on external device records 216. Positive label generator 208 is also configured to positively label the edges of the device record pairs that are identified as being duplicates of the same physical device. A positive label serves to indicate that the device record pair is equivalent. With reference to the device record graph G implementation, positive label generator 208 is configured to implement Strategy A provided below.

Strategy A: There exists an external device record graph H containing u and v such that $u\sim_H v$ implies $u\sim_G v$.

In more detail, Strategy A leverages known device record duplication in graph H to similarly determine device record duplication in graph G by mapping nodes u, v∈V to V'. For example, the nodes in graph G and graph H can be mapped using node user identifiers present in both data sources (data source of graph G and data source of graph H). Should two such devices be recorded as duplicates in graph H, these two devices can similarly be deemed duplicates in graph G. That is, should positive label generator 208 detect device equivalence of u and v in graph H, positive label generator 208 assigns a positive label to an edge e=(u,v), and stores the positively labeled edge, $u\sim_G v$, in a positively labeled edge set 220 ($E_+$).

In accordance with an embodiment, one example process for positive label generation based on Strategy A can be implemented using the following pseudocode:

| | |
|---|---|
| 1. | Input: device record graph G = {V, E} and external device record graph H = {V', E'} wheree ∈ E denotes shared authentication event and e ∈ E' denotes physical device equivalence in H. |
| 2. | Instantiate output edge set $E_{+,v}$ = 0. |
| 3. | Merge nodes in V with their representation in V'. For a given node u ∈ V, call u* its representation in V'. |

-continued

4. Add edge e = (u, v) ∈ E to E₊, if e = (u*, v*) is present in E'.
5. Return E₊.

Negative label generator 210 is configured to identify device record pairs that are likely not duplicates of the same physical device based on temporal conditions. The temporal conditions allow an inference to be drawn that the device records of a device record pair are not duplicates of the same physical device. Negative label generator 210 is also configured to negatively label the edges of the device record pairs that are identified as likely not being duplicates of the same physical device, for example, based on inferences deduced from external data. A negative label serves to indicate that the device record pair is not equivalent. One example temporal condition is based on operating system downgrades as provided by Strategy B below.

Strategy B: Operating system downgrades rarely occur and, thus, an appearance of a higher version u prior to a lower version v implies certain non-equivalence between u and v.

In more detail and with reference to the device record graph G implementation, negative label generator 210 identifies all e=(u,v)∈E such that u and v have distinct operating system versions (e.g., two Apple® laptops with MacOS versions Sierra and Mavericks). Assuming u has the higher OS version, negative label generator 210 searches for activity records $$r_{u,t_{u,k}} \text{ in } \{r_{u,t}\}_{t=t_{u,0}}^{t_u,T_u}, \text{ and } r_{v,t_{v,l}} \text{ in } \{r_{v,t}\}_{t=t_{u,0}}^{t_v,T_v}$$

such that $t_{u,k} < t_{v,l}$ for some device timestamps $t_{u,k}$ and $t_{v,l}$. If the search is successful, negative label generator 210 can conclude that u and v were likely produced from distinct physical devices (i.e., $u \sim_G v$). Negative label generator 210 assigns all such edges e a negative label, and stores the negatively labeled edges in a negatively labeled edge set 222 ($E_{-,V}$).

In accordance with an embodiment, one example process for negative label generation based on operating system downgrade temporal condition can be implemented using the following pseudocode:

1. Input: device record graph G ={V, E} and device activity log $$\{\{r_{u,t}\}_{t=t_{u,0}}^{t_uT_u}\}_{u \in V}.$$

2. Instantiate output edge set $E_{-,V}$ = 0.
3. Re-order edges in E such that for every e = (u, v) ∈ E, u has the later or equal OS version (relative to v).
4. Keep only edges in E such that u has a strictly later OS version than v. Call these edges $E_{diff}$ ⊂ E.
5. For each e = (u, v) ∈ $E_{diff}$, extract the individual records $$\{r_{u,t}\}_{t=t_{u,0}}^{t_u,T_u} \text{ and } \{r_{v,t}\}_{t=t_{v,0}}^{t_v,T_v}.$$

6. Add e to $E_{-,V}$ if there exists $t_{u,k}$ ∈{$t_{u,0}, \ldots, t_{u,T_u}$} and $t_{v,i}$ ∈{$t_{v,0}, \ldots, t_{v,T_v}$} such that $t_{u,k} < t_{v,i}$.
7. Return $E_{-,V}$.

In some embodiments, negative label generator 210 is configured to identify a subclass of devices for which the inverse of Strategy A described above holds. In an example use case and embodiment, negative label generator 210 can utilize external data sources that log mobile device activity from rare events such as manual advertiser resets. Based on the data provided by such data sources that capture rare events, negative label generator 210 can determine that distinct data source specific identifiers were indeed produced from distinct physical devices. That is, negative label generator 210 can conclude that mismatching external data source device identifiers also imply that both devices in a device record pair correspond to distinct physical devices with high likelihood. Negative label generator 210 is also configured to negatively label the edges of such device record pairs that correspond to distinct physical devices based on the inverse of Strategy A. The inverse of Strategy A is provided by Strategy C below.

Strategy C: For u, v∈M, the inverse of Strategy A is also true: $u \sim_H v$ implies $u \sim_G v$.

In more detail and with reference to the device record graph G implementation, negative label generator 210 identifies a subclass of devices M ⊂ V, such as the class of mobile devices, for example, for which the inverse of Strategy A holds. Negative label generator 210 can determine that, for the given subclass of devices M, the lack of device equivalence of u and v in graph H also implies with high likelihood their lack of device equivalence in graph G. That is, if u, v∈M and u, v∈V' but e=(u, v)∉E', then negative label generator 210 can reliably conclude that u and v were produced from distinct physical devices. In any such cases, negative label generator 210 identifies all e=(u, v)∈E for which the condition in Strategy C holds. Negative label generator 210 assigns all such edges e a negative label, and stores the negatively labeled edges, $u \sim_G v$, in a negatively labeled edge set 224 ($E_{-,M}$). In some such embodiments, negatively labeled edge set 224 ($E_{-,M}$) can be used to train a separate classifier to learn the behavior unique to the subclass of devices M. In some embodiments, the subclass of devices M ⊂ V may be provided to training label generator 202 and, in some instances, negative label generator 210.

In accordance with an embodiment, one example process for negative label generation for a subclass of devices for which the inverse of Strategy A holds can be implemented using the following pseudocode:

1. Input: device record graph G = {V, E} and external device record graph H = {V', E'}, and subclass M ⊂ V for which the lack of device equivalence of u and v in H also implies their distinction in G with high likelihood.
2. Instantiate output edge set $E_{-,M}$ = 0.
3. Merge nodes in V with their representation in V'. For a given node u ∈ V, call u* its representation in V'.
4. Add edge e = (u, v) ∈ $E_{-,M}$, if e = (u*, v*) is not present in E'.
5. Return $E_{-,M}$.

Note that not all edges e∈E in graph G may be labeled with either a positive label or a negative label. That is, some edges in graph G may remain unlabeled after execution of the pre-processing phase and the label generation phase. These unlabeled edges remain "ambiguous" in that an inference cannot be made as to the device equivalence or device non-equivalence of the device records connected by such unlabeled edges. As such, these ambiguous edges are not included as part of the labeled training datasets used to train the classifiers.

Training dataset generator 212 is configured to generate a training dataset 226 using the positively labeled device record pairs generated based on data from the external data source (e.g., Strategy A) and the negatively labeled device record pairs generated based on the temporal condition (e.g., Strategy B). In embodiments where negative label generator 210 generates negatively labeled edge set 224 ($E_{-,\mathcal{M}}$) based on the inverse of Strategy A, training dataset generator 212 is configured to generate a training dataset 228 using the positively labeled device record pairs generated based on data from the external data source and negatively labeled edge set 224 ($E_{-,\mathcal{M}}$). In any such cases, training dataset 226 includes respective feature sets for the positively labeled device record pairs and the negatively labeled device record pairs used to generate training dataset 226. Similarly, training dataset 228 includes respective feature sets for the positively labeled device record pairs and the negatively labeled device record pairs used to generate training dataset 228. In such embodiments, each feature set includes multiple feature vectors, where each feature vector represents a pair-wise matching (e.g., Boolean matching) of the attributes between the device records in a device record pair.

Figure 3:
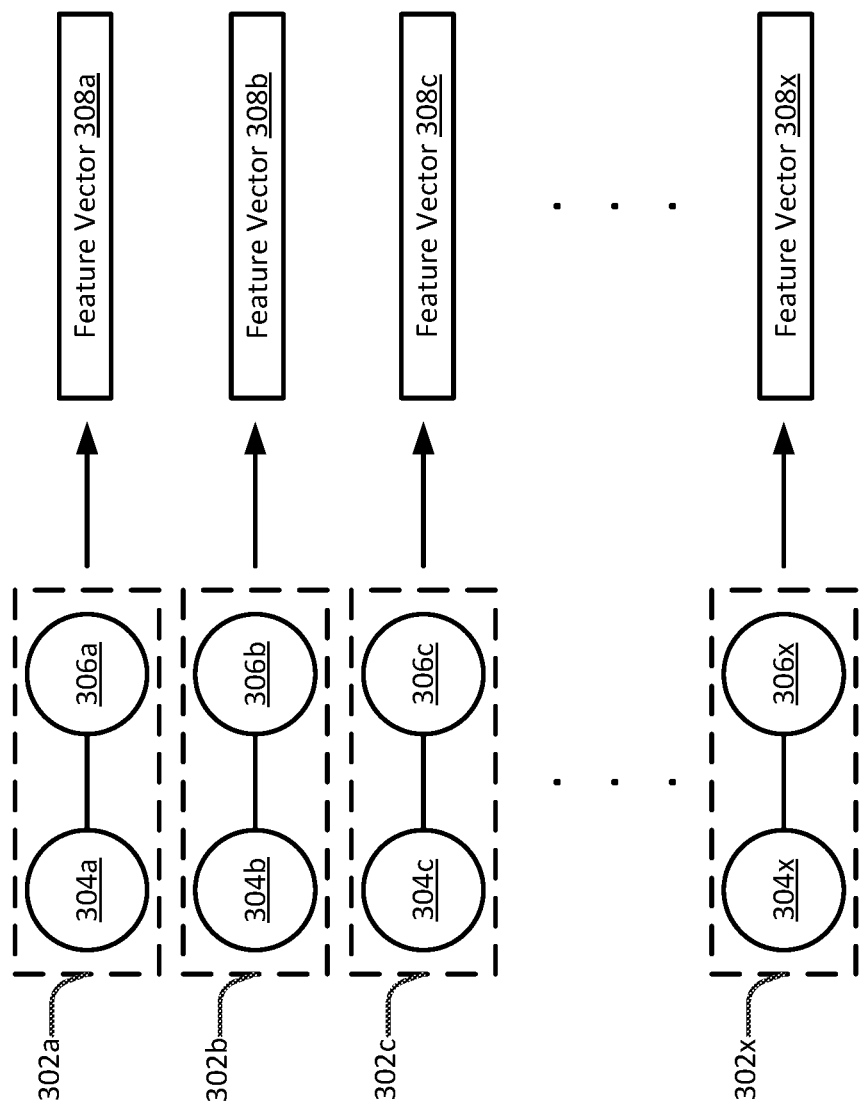
FIG. 3 is a diagram illustrating example device record pairs and associated feature vector, in accordance with an embodiment of the present disclosure.

FIG. 3 is a diagram illustrating example device record pairs and associated feature vectors, in accordance with an embodiment of the present disclosure. As depicted, a device record pair 302a includes a device record 304a and a device record 306a, a device record pair 302b includes a device record 304b and a device record 306b, a device record pair 302c includes a device record 304c and a device record 306c, and a device record pair 302x includes a device record 304x and a device record 306x. For example, the depicted device record pairs 302a-302x may comprise the positively labeled device record pairs. Associated with device record 302a is a feature vector 308a, which represents a pair-wise matching of the attributes of device record 304a and device record 306a. Similarly, a feature vector 308b is associated with device record 302b, and represents a pair-wise matching of the attributes of device record 304b and device record 306b; a feature vector 308c is associated with device record 302c, and represents a pair-wise matching of the attributes of device record 304c and device record 306c; and a feature vector 308x is associated with device record 302x, and represents a pair-wise matching of the attributes of device record 304x and device record 306x. In an example embodiment, one attribute may indicate most frequently visited IP address, and the feature vector for a device record pair can indicate whether the devices of the device record pair have matching most frequently visited IP address. In some such embodiments, the feature vector can be generated using data from device activity logs 218 and/or attributes provided with the device records. The collection of feature vectors 308a-308x may be included in a feature set. For example, the depicted device record pairs 302a-302x may comprise the positively labeled device record pairs, in which case the collection of feature vectors 308a-308x may be included in a feature set that contains the positive labels (e.g., a positively labeled feature set). Alternatively, the depicted device record pairs 302a-302x may comprise the negatively labeled device record pairs. Moreover, the number of device record pairs depicted in FIG. 3 is for illustration, and it will be appreciated in light of this disclosure that there may be a different number of device record pairs, including very large numbers of device record pairs.

Referring again to FIG. 2, training dataset 226 is for training a classifier associated with a binary classification model $L_1$, and training dataset 228 is for training another classifier associated with a binary classification model $L_2$, where model $L_1$ is separate from model $L_2$. With reference to the device model graph implementation, for model $L_1$, training dataset generator 212 generates training dataset 226, which can be denoted as $D_{L_1}$, using the union of $E_+$ and $E_{-,V}$. The union of $E_+$ and $E_{-,V}$ can be denoted as $E_{L_1}$. More specifically, training dataset generator 212 generates an edge specific feature set $$\left\{\{f_{i,e}\}_{i=0}^{N_{L_1}}\right\} e \in E_{L_1},$$

which can be denoted as $N_{L_1}$, from $E_{L_1}$ to produce $$D_{L_1} = \{f_{1,e}, \ldots, f_{N_{L_1},e}, y_e\} e \in E_{L_1},$$

where $y_e \in \{0, 1\}$ denotes an edge's positive (1) or negative (0) device equivalence label. Similarly, training dataset generator 212 generates for model $L_2$ training dataset 228, which can be denoted as $D_{L_2}$, using the union of $E_+$ and $E_{-,\mathcal{M}}$. The union of $E_+$ and $E_{-,\mathcal{M}}$ can be denoted as $E_{L_2}$. More specifically, training dataset generator 212 generates an edge specific feature set $$\left\{\{f_{i,e}\}_{i=0}^{N_{L_2}}\right\} e \in E_{L_2},$$

which can be denoted as $N_{L_2}$, from $E_{L_2}$ to produce $$D_{L_2} = \{f_{1,e}, \ldots, f_{N_{L_2},e}, y_e\} e \in E_{L_2},$$

where $y_e \in \{0, 1\}$ denotes an edge's positive (1) or negative (0) device equivalence label. In some embodiments, training dataset generator 212 can generate the feature sets $$\left\{\{f_{i,e}\}_{i=0}^{N_{L_1}}\right\} e \in E_{L_1} \text{ and/or } \left\{\{f_{i,e}\}_{i=0}^{N_{L_2}}\right\} e \in E_{L_2}$$

based on data from the device activity logs $$\{r_{u,t}\}_{t=t_{u,o}}^{t_u,T_u} u \in V$$

and/or attributes provided with the device records. For example, a feature detecting matching most frequently visited geographic locations among devices u and v in an edge e=(u,v) can be produced from the activity logs.

Figure 4:
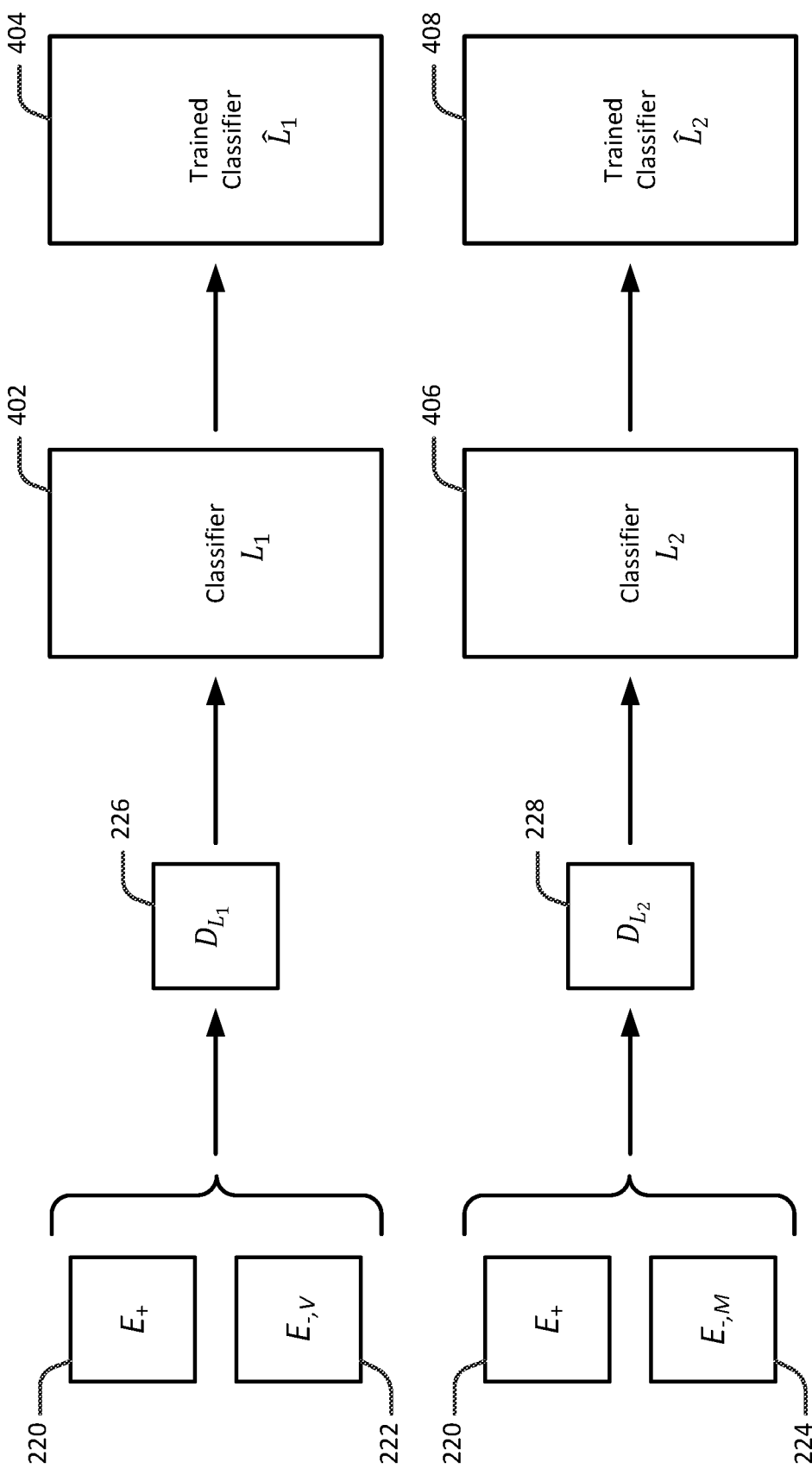
FIG. 4 is a diagram illustrating an example training of two classifiers, in accordance with an embodiment of the present disclosure.

FIG. 4 is a diagram illustrating an example training of two classifiers, in accordance with an embodiment of the present disclosure. As depicted, training dataset 226 ($D_{L_1}$) is used to train a classifier 402 associated with model $L_1$ to generate a trained classifier 404 ($\hat{L}_1$). Similarly, training dataset 228 ($D_{L_2}$) is used to train a classifier 406 associated with model $L_2$ to generate a trained classifier 408 ($\hat{L}_2$). As described previously, training dataset 226 ($D_{L_1}$) is generated from positively labeled edge set 220 ($E_+$) and negatively labeled edge set 222 ($E_{-,V}$), and training dataset 228 ($D_{L_2}$) is generated from positively labeled edge set 220 ($E_+$) and negatively labeled edge set 224 ($E_{-,\mathcal{M}}$). Trained classifier 404 ($\hat{L}_1$) can, provided a new device record pair, predict with confidence whether the device records of the new device record pair represent the same physical device (e.g., device equivalence). Similarly, trained classifier 408 ($\hat{L}_2$) can, provided a new device record pair that belongs to the subset class of devices over which trained classifier 408 ($\hat{L}_2$) was learned, predict with confidence whether the device records of the new device record pair represent the same physical device (e.g., device equivalence).

Figure 5:
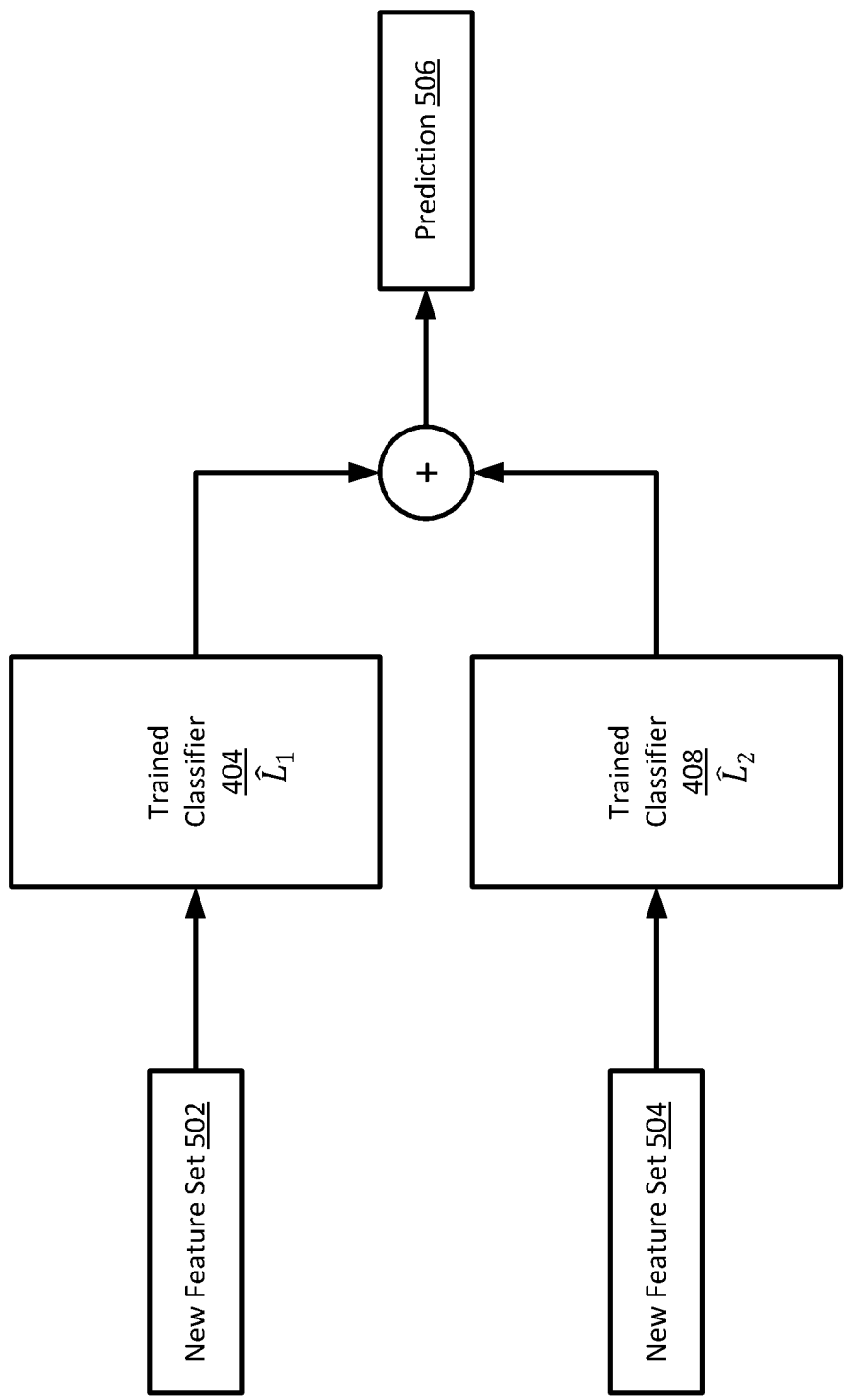
FIG. 5 is a diagram illustrating an example prediction by the trained classifiers of FIG. 4, in accordance with an embodiment of the present disclosure.

FIG. 5 is a diagram illustrating an example prediction by trained classifiers 404 ($\hat{L}_1$) and 408 ($\hat{L}_2$) of FIG. 4, in accordance with an embodiment of the present disclosure. As depicted, trained classifier 404 ($\hat{L}_1$) is applied to a new feature set 502, and trained classifier 408 ($\hat{L}_2$) is applied to a new feature set 504. New feature set 502 includes a set of feature vectors, where each feature vector corresponds to a respective new device record pair, for which a determination is to be made as to device equivalence or device-non-equivalence. Similarly, new feature set 504 includes a set of feature vectors, where each feature vector corresponds to a respective new device record pair that belongs to the subset class of devices over which trained classifier 408 ($\hat{L}_2$) was learned, for which a determination is to be made as to device equivalence or device-non-equivalence. Note that feature vectors that represent a pair-wise matching of the attributes associated with the device records of a device record pair are provided to the respective trained classifiers since the trained classifiers were trained using such feature vectors. Further, since the device record pairs that belong to the subset of devices over which trained classifier 408 ($\hat{L}_2$) may be included in both new feature sets 502 and 504 (e.g., may be input to both trained classifier 404 ($\hat{L}_1$) and trained classifier 408 ($\hat{L}_2$)), a logical OR operation is performed on the predictions (e.g., output) from trained classifier 404 ($\hat{L}_1$) and trained classifier 408 ($\hat{L}_2$) to generate a prediction 506. In more detail and with reference to the device record graph G implementation, trained classifier 404 ($\hat{L}_1$) and trained classifier 408 ($\hat{L}_2$) can be applied to a new input device record graph $G_{new} = \{V_{new}, E_{new}\}$, having corresponding Strategy C node subset $M_{new}$, and device activity log $$\{\{r_{u,t}\}_{t=t_{u,0}}^{t_u, T_u}\} \; u \in V_{new}.$$

From this, feature sets $$D_{L_1, new} \in \{f_{1,e}, \ldots, f_{N_{L_1}, e_u}\} \; e \in E_{new}$$

(e.g., new feature set 502) and $$D_{L_2, new} \in \{f_{1,e}, \ldots, f_{N_{L_2}, e_u}\} \; e \in \{(u, v) E_{new}: u, v \in M_{new}\}$$

(e.g., new feature set 504) can be generated for input to trained classifier 404 ($\hat{L}_1$) and trained classifier 408 ($\hat{L}_2$), respectively. Trained classifier 404 ($\hat{L}_1$) and trained classifier 408 ($\hat{L}_2$) can then generate predictions of device equivalence (or non-equivalence) for edges $e \in E_{new}$ (e.g., prediction of device equivalence labels on edges $e \in E_{new}$). Note that $$D_{L_1, new} \in \{f_{1,e}, \ldots, f_{N_{L_1}, e_u}\} \; e \in E_{new} \text{ and}$$

$$D_{L_2, new} \in \{f_{1,e}, \ldots, f_{N_{L_2}, e_u}\} \; e \in \{(u, v) E_{new}: u, v \in M_{new}\}$$

match the structure of the feature sets of training datasets 226 and 228 over which trained classifier 404 ($\hat{L}_1$) and trained classifier 408 ($\hat{L}_2$), respectively, were learned. In some embodiments, the new data (e.g., new input device record graph $G_{new} = \{V_{new}, E_{new}\}$) can be processed to filter out the trivial device record pairs and to positively or negatively label edges according to any or all of Strategy A, Strategy B, and Strategy C, described above, prior to being provided to trained classifier 404 ($\hat{L}_1$) and trained classifier 408 ($\hat{L}_2$).

Figure 6:
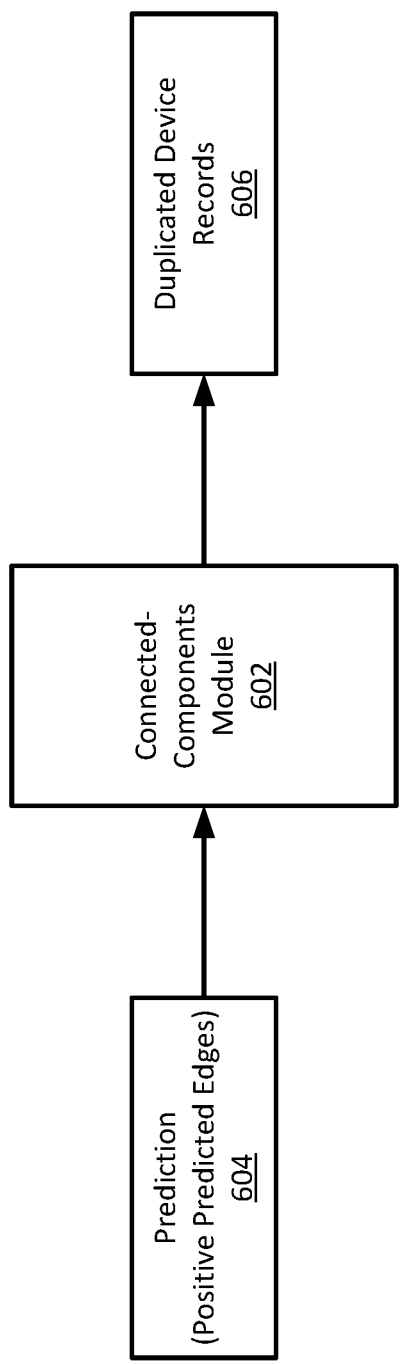
FIG. 6 is a diagram illustrating an example connected-components analysis by a connected-components module, in accordance with an embodiment of the present disclosure.

FIG. 6 is a diagram illustrating an example connected-components analysis by a connected-components module 602, in accordance with an embodiment of the present disclosure. Connected-components module 602 is configured to perform a connected-components analysis based on the transitive property. As depicted, a prediction 604 is provided as input to connected-components module 602, and connected-components module 602 generates one or more duplicate device records 606. In an example use case and embodiment, prediction 604 includes the device record pairs that are duplicates of the same physical device. For example, prediction 604 may be created from the predictions generated by trained classifier 404 ($\hat{L}_1$) and trained classifier 408 ($\hat{L}_2$). Connected-components module 602 can process each device record pair included in prediction 604 to identify other device records in prediction 604 that are duplicates (e.g., equivalent) of the device record pair. For example, suppose a device record A and a device record B are identified as a device record pair and device record B and a device record C are identified as another device record pair in prediction 604. In this case, connected-components module 602 identifies device records A, B, and C as being duplicates of the same physical device. In an example implementation, connected-components module 602 can generate clusters of device records in which any device record in a specific cluster is connected to the other device records in the specific cluster through a sequence of sequence links. In more detail and with reference to the device record graph G implementation, a subgraph $G_{equiv}$ of $G_{new}$ can be constructed using only the positively predicted edges. That is, the edges $e = (u, v) \in E_{equiv}$ in subgraph $G_{equiv}$ (prediction 604) represent device equivalence relations among the remaining nodes. Connected-components module 602 performs a connected-components analysis on subgraph $G_{equiv}$ to generate $N_{unique}$ device equivalent components $\{C_j\}_{j=1}^{N_{unique}}$ (duplicated device records 606). For example, connected-components module 602 can compute the connected components in $G_{equiv}$ using a breadth-first graph search or a depth-first graph search. Then, in an example use case, for all components $C_j \in \{C_j\}_{j=1}^{N_{unique}}$, individual device records $u \in C_j$ can be replaced with a common device record $u_{C_j}$, where device record $u_{C_j}$ is representative of a single physical device.

Figure 7:
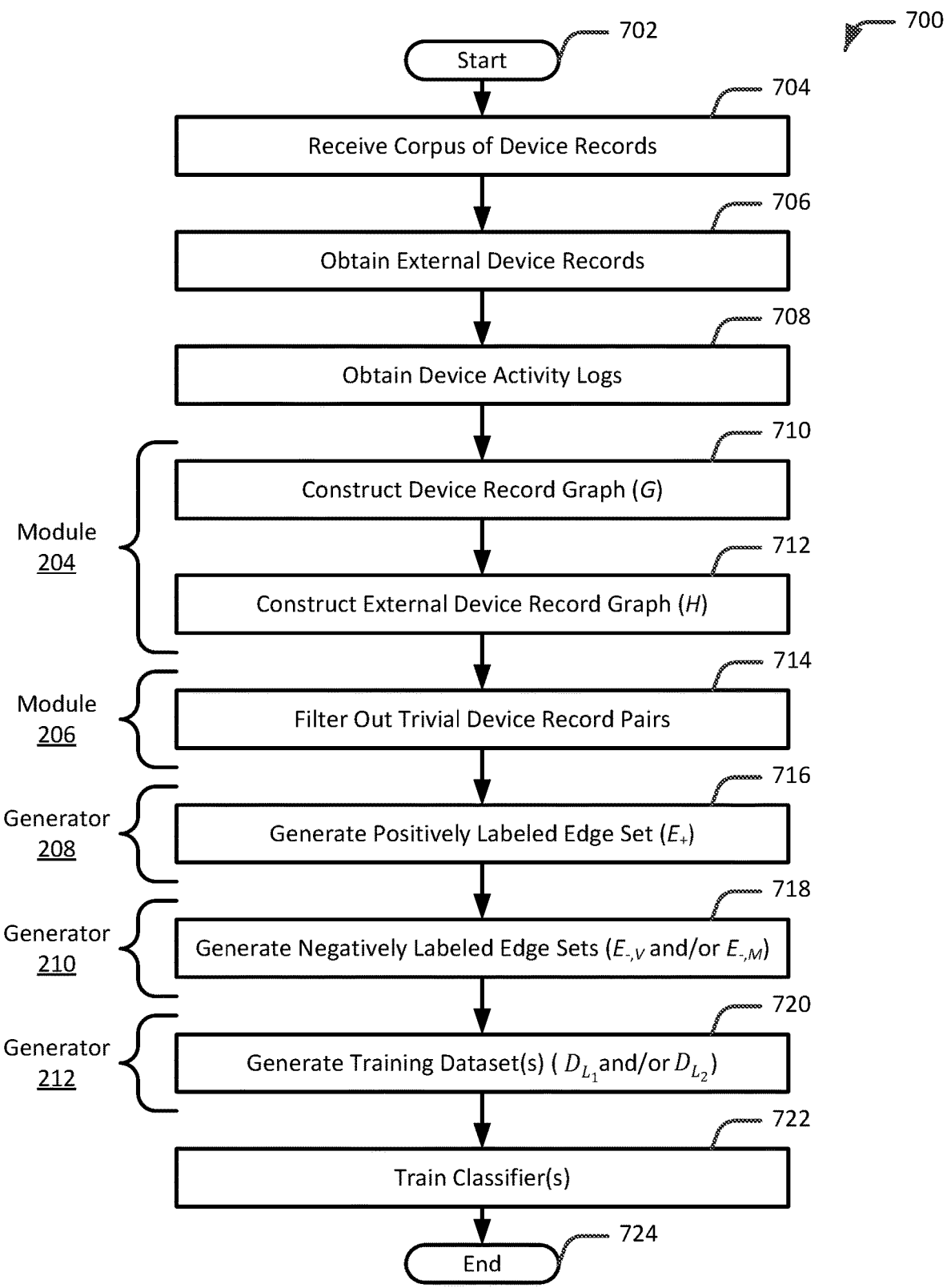
FIG. 7 is a flow diagram illustrating an example process to generate training dataset(s) for training a classifier(s), in accordance with an embodiment of the present disclosure.

FIG. 7 is a flow diagram 700 illustrating an example process to generate training dataset(s) for training a classifier(s), in accordance with at least some embodiments described herein. Example processes and methods may include one or more operations, functions or actions as illustrated by one or more of blocks 702, 704, 706, 708, 710, 712, 714, 716, 718, 720, 722 and/or 724, and may in some embodiments be performed by a computing system such as a computing system 800 of FIG. 8. The operations described in blocks 702-724 may also be stored as computer-executable instructions in a computer-readable medium, such as a memory 804 and/or a data storage 806 of computing system 800. The process may be performed by components of training label generator 202.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

As depicted by flow diagram 700, the process is initiated at block 702. At block 704, a corpus of device records are received from which to generate the training data sets for training machine learning algorithms to predict the occurrence of duplicate device records. As previously described, the corpus of device records may be received as part of a device analytics platform. At block 706, external device records that can be leveraged to identify device record pairs created from the device records to positively label are obtained. The external device records may be obtained from a more persistent record keeping source. At block 708, device activity logs associated with the devices identified by the corpus of device records are obtained. At block 710, a device record graph G is constructed from the received corpus of device records. At block 712, an external device record graph H is constructed from the obtained external device records. At block 714, the trivial device record pairs are identified and filtered out from graph G. As previously described, in an embodiment, the trivial device record pairs are filtered out from graph G by removing the edges between the trivial device record pairs, thus not leaving an edge to label during the label generation phase. At block 716, a positively labeled edge set $E_+$ from the device record pairs in graph G is generated based on data from graph H (e.g., the external device records). As previously described, in an embodiment, positively labeled edge set $E_+$ can be generated by applying Strategy A. At block 718, a negatively labeled edge set $E_{-,V}$ from the device record pairs in graph G is generated based on a temporal condition or conditions associated with the device records of the device record pairs. As previously described, in an embodiment, negatively labeled edge set $E_{-,V}$ can be generated by applying Strategy B. In some embodiments, a negatively labeled edge set $E_{-,V}$ from the device record pairs in graph G is also generated for a subclass of devices $M \subset V$ for which the inverse of Strategy A holds. As previously described, in an embodiment, negatively labeled edge set $E_{-,M}$ can be generated by applying Strategy C. At block 720, a training dataset $D_{L_1}$ is generated from positively labeled edge set $E_+$ and negatively labeled edge set $E_{-,V}$. Additionally, in cases where negatively labeled edge set $E_{-,M}$ is generated, a training dataset $D_{L_2}$ can be generated from positively labeled edge set $E_+$ and negatively labeled edge set $E_{-,M}$. At block 722, separate classifiers can be trained using training dataset $D_{L_1}$ and training dataset $D_{L_2}$, respectively. As previously described, a classifier associated with a model $L_1$ can be trained using training dataset $D_{L_1}$ to generate a trained classifier $\hat{L}_1$, and a separate classifier associated with a model $L_2$ can be trained using training dataset $D_{L_2}$ to generate a trained classifier $\hat{L}_2$. The process ends at block 724.

Figure 8:
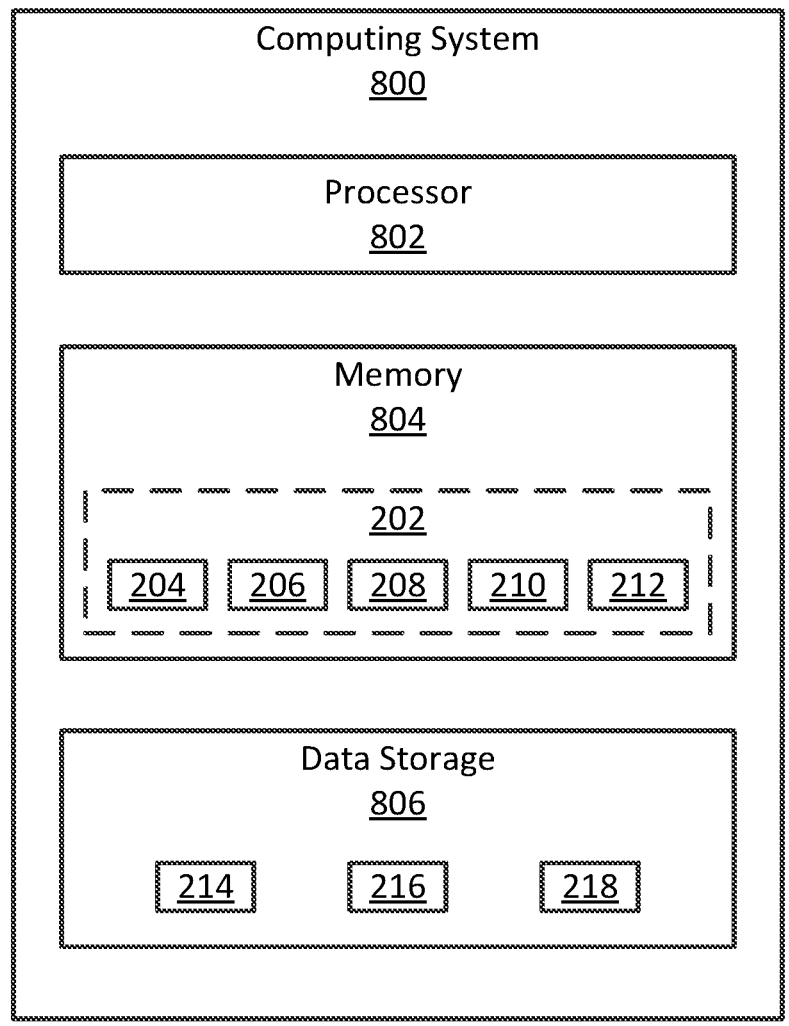
FIG. 8 illustrates selected components of an example computing system that may be used to perform any of the techniques as variously described in the present disclosure.

FIG. 8 illustrates selected components of example computing system 800 that may be used to perform any of the techniques as variously described in the present disclosure. In some embodiments, computing system 800 may be configured to implement or direct one or more operations associated with some or all of the engines, components and/or modules associated with training label generator 202 of FIG. 2 and connected-components module 602 of FIG. 6. For example, initialization module 204, pre-preprocess module 206, positive label generator 208, negative label generator 210, training dataset generator 212, and connected-components module 602, or any combination of these may be implemented in and/or using computing system 800. In one example case, for instance, each of initialization module 204, pre-preprocess module 206, positive label generator 208, negative label generator 210, training dataset generator 212, and connected-components module 602 is loaded in memory 804 and executable by processor 802, and device records 214, external device records 216, and device activity logs 218 is included in data storage 806. Computing system 800 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), or other form of computing or telecommunications device that is capable of communication and that has sufficient processor power and memory capacity to perform the operations described in this disclosure. A distributed computational system may be provided that includes a multiple of such computing devices. As depicted, computing system 800 may include processor 802, memory 804, and data storage 806. Processor 802, memory 804, and data storage 806 may be communicatively coupled.

In general, processor 802 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 802 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 8, processor 802 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 802 may be configured to interpret and/or execute program instructions and/or process data stored in memory 804, data storage 806, or memory 804 and data storage 806. In some embodiments, processor 802 may fetch program instructions from data storage 806 and load the program instructions in memory 804. After the program instructions are loaded into memory 804, processor 802 may execute the program instructions.

For example, in some embodiments, any one or more of the engines, components and/or modules of training label generator 202 and connected-components module 602 may be included in data storage 806 as program instructions. Processor 802 may fetch some or all of the program instructions from data storage 806 and may load the fetched program instructions in memory 804. Subsequent to loading the program instructions into memory 804, processor 802 may execute the program instructions such that the computing system may implement the operations as directed by the instructions.

In some embodiments, virtualization may be employed in computing device 800 so that infrastructure and resources in computing device 800 may be shared dynamically. For example, a virtual machine may be provided to handle a process running on multiple processors so that the process appears to be using only one computing resource rather than multiple computing resources. Multiple virtual machines may also be used with one processor.

Memory 804 and data storage 806 may include computer-readable storage media for carrying or having computer-executable instructions or data structures stored thereon. Such computer-readable storage media may include any available media that may be accessed by a general-purpose or special-purpose computer, such as processor 802. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 802 to perform a certain operation or group of operations.

Modifications, additions, or omissions may be made to computing system 800 without departing from the scope of the present disclosure. For example, in some embodiments, computing system 800 may include any number of other components that may not be explicitly illustrated or described herein.

As indicated above, the embodiments described in the present disclosure may include the use of a special purpose or a general purpose computer (e.g., processor 802 of FIG. 8) including various computer hardware or software modules, as discussed in greater detail herein. As will be appreciated, once a general purpose computer is programmed or otherwise configured to carry out functionality according to an embodiment of the present disclosure, that general purpose computer becomes a special purpose computer. Further, as indicated above, embodiments described in the present disclosure may be implemented using computer-readable media (e.g., memory 804 of FIG. 8) for carrying or having computer-executable instructions or data structures stored thereon.

Numerous example variations and configurations will be apparent in light of this disclosure. According to some examples, computer-implemented methods to generate training data for training a classifier for identification of physical user devices are described. An example computer-implemented method may include: receiving device record data comprising multiple device records; identifying multiple device record pairs from the multiple device records; pre-processing the multiple device record pairs to filter out trivial device record pairs, wherein the pre-processing results in a remaining multiple device record pairs; generating a set of positively labeled device record pairs from the remaining multiple device record pairs; generating a set of negatively labeled device record pairs from the remaining multiple device record pairs; generating a training dataset from the set of positively labeled device record pairs and the set of negatively labeled device record pairs; and training a classifier using the training dataset.

In some examples, trivial device record pairs include device record pairs of non-matching device hardware types. In other examples, trivial device record pairs include device record pairs of non-matching device operating system types. In still other examples, generating the set of positively labeled device record pairs is based on data from an external data source. In yet other examples, generating the set of negatively labeled device record pairs is based on a temporal condition associated with the device records of the device record pairs. In further examples, generating the set of negatively labeled device record pairs is based on data from an external data source. In still further examples, generating the set of positively labeled device record pairs is based on data from an external data source, and the set of negatively labeled device record pairs is a first set of negatively labeled device record pairs, and the classifier is a first classifier, and generating the first set of negatively labeled device record pairs is based on a temporal condition associated with the device records of the device record pairs, and the method may also include: generating a second set of negatively labeled device record pairs from the remaining multiple device record pairs based on data from the external data source; generating a second training dataset from the set of positively labeled device record pairs and the second set of negatively labeled device record pairs; and training a second classifier using the second training dataset. In yet further examples, generating the second set of negatively labeled device record pairs is based on an inverse of a condition satisfied for generating the set of positively labeled device record pairs based on data from an external data source. In other examples, the method also includes predicting, by the classifier based on an input to receive a feature set comprising one or more feature vectors, each feature vector representing a device record pair, equivalence or non-equivalence of each feature vector in the feature set.

According to some examples, systems to generate training data for training a classifier for identification of physical user devices are described. An example system may include: one or more non-transitory machine readable mediums configured to store instructions; and one or more processors configured to execute the instructions stored on the one or more non-transitory machine readable mediums. Execution of the instructions by the one or more processors may cause the one or more processors to: receive device record data comprising multiple device records; identify multiple device record pairs from the multiple device records; pre-process the multiple device record pairs to filter out trivial device record pairs, wherein the pre-processing results in a remaining multiple device record pairs; generate a set of positively labeled device record pairs from the remaining multiple device record pairs; generate a set of negatively labeled device record pairs from the remaining multiple device record pairs; generate a training dataset from the set of positively labeled device record pairs and the set of negatively labeled device record pairs; and train a classifier using the training dataset.

In some examples, trivial device record pairs include one or more of device record pairs of non-matching device hardware types and device record pairs of non-matching device operating system types. In other examples, to generate the set of positively labeled device record pairs is based on data from an external data source. In still other examples, to generate the set of negatively labeled device record pairs is based on a temporal condition associated with the device records of the device record pairs. In yet other examples, to generate the set of positively labeled device record pairs is based on data from an external data source, and the set of negatively labeled device record pairs is a first set of negatively labeled device record pairs, and the classifier is a first classifier, and to generate the first set of negatively labeled device record pairs is based on a temporal condition associated with the device records of the device record pairs, and the one or more non-transitory machine readable mediums may further store instructions that, in response to execution by the one or more processors, cause the one or more processors to: generate a second set of negatively labeled device record pairs from the remaining multiple device record pairs based on data from the external data source; generate a second training dataset from the set of positively labeled device record pairs and the second set of negatively labeled device record pairs; and train a second classifier using the second training dataset. In further examples, to generate the second set of negatively labeled device record pairs is based on an inverse of a condition satisfied for generating the set of positively labeled device record pairs based on data from an external data source.

According to some examples, computer program products including one or more non-transitory machine readable mediums encoded with instructions that when executed by one or more processors cause a process to be carried out for generating training data for training a classifier for identification of physical user devices are described. An example process may include: receiving device record data comprising multiple device records; identifying multiple device record pairs from the multiple device records; pre-processing the multiple device record pairs to filter out trivial device record pairs, wherein the pre-processing results in a remaining multiple device record pairs; generating a set of positively labeled device record pairs from the remaining multiple device record pairs; generating a set of negatively labeled device record pairs from the remaining multiple device record pairs; generating a training dataset from the set of positively labeled device record pairs and the set of negatively labeled device record pairs; and training a classifier using the training dataset.

In some examples, trivial device record pairs include one or more of device record pairs of non-matching device hardware types and device record pairs of non-matching device operating system types. In other examples, generating the set of positively labeled device record pairs is based on data from an external data source, and generating the set of negatively labeled device record pairs is based on a temporal condition associated with the device records of the device record pairs. In still other examples, the set of negatively labeled device record pairs is a first set of negatively labeled device record pairs, and the classifier is a first classifier, and the process may also include: generating a second set of negatively labeled device record pairs from the remaining multiple device record pairs based on data from the external data source; generating a second training dataset from the set of positively labeled device record pairs and the second set of negatively labeled device record pairs; and training a second classifier using the second training dataset. In yet other examples, generating the second set of negatively labeled device record pairs is based on an inverse of a condition satisfied for generating the set of positively labeled device record pairs based on data from an external data source.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method to generate training data for training a classifier for identification of physical user devices, the method comprising:
receiving a plurality of browser cookie device records, each of which represents one of a first plurality of user authentications, wherein the browser cookie device records are generated using browser cookie data;
receiving a plurality of persistent identifier device records, each of which represents one of a second plurality of user authentications, wherein the persistent identifier device records are generated using an identifier that is more persistent than the browser cookie data;
identifying a persistent identifier device record pair that includes a first persistent identifier device record having first device information and a second persistent identifier device record having second device information, wherein it is assumed that the first and second device information both identify a single particular device;
identifying a first browser cookie device record pair that includes a first browser cookie device record having the first device information that was included in the first persistent identifier device record and a second browser cookie device record having the second device information that was included in the second persistent identifier device record;
identifying a second browser cookie device record pair that includes two browser cookie device records that, collectively, do not include both the first and second device information;
labeling the first browser cookie device record pair as corresponding to equivalent physical devices;
labeling the second browser cookie device record pair as corresponding to distinct physical devices; and
generating a training dataset that includes the labeled first browser cookie device record pair and the labeled second browser cookie device record pair.

2. The method of claim 1,
further comprising preprocessing the plurality of browser cookie device records to filter out a trivial device record pair;
wherein the trivial device record pair includes a third browser cookie device record that identifies a first device hardware type and a fourth browser cookie device record that identifies a second device hardware type; and
wherein the first and second device hardware types are different.

3. The method of claim 1,
further comprising preprocessing the plurality of browser cookie device records to filter out a trivial device record pair;
wherein the trivial device record pair includes a third browser cookie device record that identifies a first operating system type and a fourth browser cookie device record that identifies a second operating system type; and
wherein the first and second operating system types are different.

4. The method of claim 1, further comprising training a classifier using the training dataset.

5. The method of claim 1, further comprising:
identifying a third browser cookie device record pair that includes two browser cookie device records related by a temporal condition; and
labeling the third browser cookie device record pair as corresponding to distinct physical devices based on the temporal condition.

6. The method of claim 1, further comprising:
generating an additional browser cookie device record pair that is labeled as corresponding to distinct physical devices, wherein the additional browser cookie device record pair is generated from amongst browser cookie device records which do not form part of the first browser cookie device record pair;
generating an additional training dataset that includes the first browser cookie device record pair and the additional browser cookie device record pair; and
training a classifier using the additional training dataset.

7. The method of claim 1, further comprising:
training a classifier using the training dataset; and
predicting, by the classifier, whether an unclassified device record pair represents one device.

8. A system to generate training data for training a classifier for identification of physical user devices, the system comprising:
one or more non-transitory machine readable mediums configured to store instructions; and
one or more processors configured to execute the instructions stored on the one or more non-transitory machine readable mediums, wherein execution of the instructions causes the one or more processors to:
receive a plurality of browser cookie device records, each of which represents one of a first plurality of user authentications, wherein the browser cookie device records are generated using browser cookie data;
receive a plurality of persistent identifier device records, each of which represents one of a second plurality of user authentications, wherein the persistent identifier device records are generated using an identifier that is more persistent than the browser cookie data;
identify a persistent identifier device record pair that includes a first persistent identifier device record having first device information and a second persistent identifier device record having second device information, wherein it is assumed that the first and second device information both identify a single particular device;
identify a first browser cookie device record pair that includes a first browser cookie device record having the first device information that was included in the first persistent identifier device record and a second browser cookie device record having the second device information that was included in the second persistent identifier device record;
identify a second browser cookie device record pair that includes two browser cookie device records that, collectively, do not include both the first and second device information;
label the first browser cookie device record pair as corresponding to equivalent physical devices;
label the second browser cookie device record pair as corresponding to distinct physical devices; and
generate a training dataset that includes the labeled first browser cookie device record pair and the labeled second browser cookie device record pair.

9. The system of claim 8, wherein:
execution of the instructions causes the one or more processors to further preprocess the plurality of browser cookie device records to filter out a trivial device record pair;
the trivial device record pair includes a third browser cookie device record that identifies a first operating system type and a fourth browser cookie device record that identifies a second operating system type; and
the first and second operating system types are different.

10. The system of claim 8, wherein execution of the instructions causes the one or more processors to further train a classifier using the training dataset.

11. The system of claim 8, wherein execution of the instructions causes the one or more processors to further:
identify a third browser cookie device record pair that includes two browser cookie device records related by a temporal condition; and
label the third browser cookie device record pair as corresponding to distinct physical devices based on the temporal condition.

12. The system of claim 8, wherein execution of the instructions causes the one or more processors to further:
generate an additional browser cookie device record pair that is labeled as corresponding to distinct physical devices, wherein the additional browser cookie record pair is generated from amongst browser cookie device records which do not form part of the first browser cookie device record pair; and
generate an additional training dataset that includes the first browser cookie device record pair and the additional browser cookie device record pair.

13. The system of claim 8, wherein execution of the instructions causes the one or more processors to further:
generate an additional browser cookie device record pair that is labeled as corresponding to distinct physical devices, wherein the additional browser cookie record pair is generated from amongst browser cookie device records which do not form part of the first browser cookie device record pair;
generate an additional training dataset that includes the first browser cookie device record pair and the additional browser cookie device record pair; and
train a classifier using the additional training dataset.

14. A computer program product including one or more non-transitory machine readable mediums encoded with instructions that when executed by one or more processors cause a process to be carried out for generating training data for training a classifier for identification of physical user devices, the process comprising:
receiving a plurality of browser cookie device records, each of which represents one of a first plurality of user authentications, wherein the browser cookie device records are generated using browser cookie data;
receiving a plurality of persistent identifier device records, each of which represents one of a second plurality of user authentications, wherein the persistent identifier device records are generated using an identifier that is more persistent than the browser cookie data;
identifying a persistent identifier device record pair that includes a first persistent identifier device record having first device information and a second persistent identifier device record having second device information, wherein it is assumed that the first and second device information both identify a single particular device;
identifying a first browser cookie device record pair that includes a first browser cookie device record having the first device information that was included in the first persistent identifier device record and a second browser cookie device record having the second device information that was included in the second persistent identifier device record;
identifying a second browser cookie device record pair that includes two browser cookie device records that, collectively, do not include both the first and second device information;
labeling the first browser cookie device record pair as corresponding to equivalent physical devices;
labeling the second browser cookie device record pair as corresponding to distinct physical devices; and
generating a training dataset that includes the labeled first browser cookie device record pair and the labeled second browser cookie device record pair.

15. The computer program product of claim 14, wherein:
the process further comprises preprocessing the plurality of browser cookie device records to filter out a trivial device record pair;
the trivial device record pair includes a third browser cookie device record that identifies a first operating system type and a fourth browser cookie device record that identifies a second operating system type; and
the first and second operating system types are different.

16. The computer program product of claim 14, wherein the process further comprises:
identifying a third browser cookie device record pair that includes two browser cookie device records related by a temporal condition; and
labeling the third browser cookie device record pair as corresponding to distinct physical devices based on the temporal condition.

17. The computer program product of claim 16, wherein the process further comprises:
generating an additional browser cookie device record pair that is labeled as corresponding to distinct physical devices, wherein the additional browser cookie device record pair is generated from amongst browser cookie device records which do not form part of the first browser cookie device record pair; and
generating an additional training dataset that includes the first browser cookie device record pair and the additional browser cookie device record pair.

18. The computer program product of claim 14, wherein the process further comprises:
generating an additional browser cookie device record pair that is labeled as corresponding to distinct physical devices, wherein the additional browser cookie device record pair is generated from amongst browser cookie device records which do not form part of the first browser cookie device record pair;
generating an additional training dataset that includes the first browser cookie device record pair and the additional browser cookie device record pair; and
training a classifier using the additional training dataset.

19. The computer program product of claim 14, wherein at least one of the persistent identifier device records is generated using an identifier that is extracted from an Identifier for Advertising (IDFA) log stored on a device used to perform at least one of the second plurality of user authentications.

* * * * *